US006986128B2

(12) United States Patent
Linden

(10) Patent No.: US 6,986,128 B2
(45) Date of Patent: Jan. 10, 2006

(54) MULTIPLE STAGE PROGRAM RECOMPILER AND METHOD

(75) Inventor: Randal N. Linden, Los Angeles, CA (US)

(73) Assignee: Sony Computer Entertainment Inc., (JP)

( * ) Notice: Subject to any disclaimer, the term of this patent is extended or adjusted under 35 U.S.C. 154(b) by 529 days.

(21) Appl. No.: 09/755,542

(22) Filed: Jan. 5, 2001

(65) Prior Publication Data

US 2002/0066086 A1 May 30, 2002

Related U.S. Application Data

(60) Provisional application No. 60/175,008, filed on Jan. 7, 2000.

(51) Int. Cl.
  *G06F 9/45* (2006.01)
(52) U.S. Cl. .................... 717/140; 717/145; 717/152; 717/155
(58) Field of Classification Search ................. 717/138, 717/137, 140–155, 136, 159, 124, 17; 714/38; 711/202; 712/209; 707/10; 703/17
  See application file for complete search history.

(56) References Cited

U.S. PATENT DOCUMENTS

| 5,133,072 A | * | 7/1992 | Buzbee ........................ 717/152 |
| 5,193,190 A | * | 3/1993 | Janczyn et al. ............. 717/156 |
| 5,212,794 A | * | 5/1993 | Pettis et al. .................. 717/153 |
| 5,396,631 A | * | 3/1995 | Hayashi et al. ............. 717/159 |
| 5,507,030 A | * | 4/1996 | Sites ............................ 717/136 |
| 5,551,039 A | * | 8/1996 | Weinberg et al. ........... 717/150 |
| 5,560,013 A | * | 9/1996 | Scalzi et al. ................. 717/138 |
| 5,583,983 A | * | 12/1996 | Schmitter ................... 717/138 |
| 5,724,590 A | * | 3/1998 | Goettelmann et al. ....... 717/154 |
| 5,748,878 A | * | 5/1998 | Rees et al. ..................... 714/38 |
| 5,768,593 A | * | 6/1998 | Walters et al. .............. 717/141 |
| 5,966,537 A | * | 10/1999 | Ravichandran ............. 717/158 |
| 6,026,240 A | * | 2/2000 | Subramanian .............. 717/161 |
| 6,031,992 A | * | 2/2000 | Cmelik et al. .............. 717/138 |
| 6,035,120 A | * | 3/2000 | Ravichandran ............. 717/141 |
| 6,085,029 A | * | 7/2000 | Kolawa et al. ............... 714/38 |
| 6,115,710 A | * | 9/2000 | White ......................... 707/10 |
| 6,161,200 A | * | 12/2000 | Rees et al. ..................... 714/38 |
| 6,490,721 B1 | * | 12/2002 | Gorshkov et al. .......... 717/130 |

(Continued)

OTHER PUBLICATIONS

Joel Auslander, Fast, effective dynamic compilation, 1996, ACM Press, pp. 149-159.*

(Continued)

*Primary Examiner*—Tuan Dam
*Assistant Examiner*—Satish S. Rampuria
(74) *Attorney, Agent, or Firm*—Lerner, David, Littenberg, Krumholz & Mentlik, LLP

(57) ABSTRACT

A method for dynamic recompilation of source software instructions for execution by a target processor, which considers not only the specific source instructions, but also the intent and purpose of the instructions, to translate and optimize a set of equivalent code for the target processor. The dynamic recompiler determines what the source operation code is trying to accomplish and the optimum way of doing it at the target processor, in an "interpolative" and context sensitive fashion. The source instructions are processed in blocks of varying sizes by the dynamic recompiler, which considers the instructions that come before and after a current instruction to determine the most efficient approach out of several available approaches for encoding the operation code for the target processor to perform the equivalent tasks specified by the source instructions. The dynamic compiler comprises a decoding stage, an optimization stage and an encoding stage.

39 Claims, 3 Drawing Sheets

U.S. PATENT DOCUMENTS

| | | | |
|---|---|---|---|
| 6,519,768 B1 * | 2/2003 | Hughes et al. | 717/159 |
| 6,526,570 B1 * | 2/2003 | Click, Jr. et al. | 717/146 |
| 6,532,532 B1 * | 3/2003 | Eaton et al. | 712/209 |
| 6,564,373 B1 * | 5/2003 | Hughes et al. | 717/158 |
| 6,658,655 B1 * | 12/2003 | Hoogerbrugge et al. | 717/139 |
| 6,675,374 B2 * | 1/2004 | Pieper et al. | 717/141 |
| 6,675,375 B1 * | 1/2004 | Czajkowski | 717/151 |
| 6,708,325 B2 * | 3/2004 | Cooke et al. | 717/124 |
| 6,728,950 B2 * | 4/2004 | Davis et al. | 717/136 |
| 6,751,583 B1 * | 6/2004 | Clarke et al. | 703/17 |
| 2002/0166112 A1 * | 11/2002 | Martin et al. | 717/124 |
| 2004/0205728 A1 * | 10/2004 | Hanson | 717/129 |

OTHER PUBLICATIONS

Williams, Compiler technology tracks advances in CPU architectures, Penton's Embedded Systems Development. Aug. 1999. vol. 2, Iss. 8; p. 42 (4 pages).*

Ohr, Development tools target hand-coding, Electronic Engineering Times. Manhasset: Apr. 20, 1998. p. 91 (4 pages).*

Lee, Java execution a hot topic, Electronic News. New York: Apr. 6, 1998. vol. 44, Iss. 2213; p. 32 (1 page).*

Leupers et al., Instruction-set modelling for ASIP code generation, IEEE, Jan. 3-6, 1996 Page(s):77-80.*

Wess, Automatic instruction code generation based on trellis diagrams, IEEE, May 3-6, 1992 Page(s):645-648 vol. 2.*

Liem et al., Industrial experience using rule-driven retargetable code generation for multimedia applications, IEEE, Sep. 13-15, 1995 Page(s):60-65.*

Kreuzer et al., A retargetable optimizing code generator for digital signal processors, IEEE, May 12-15, 1996 Page(s): 257-260 vol. 2.*

* cited by examiner

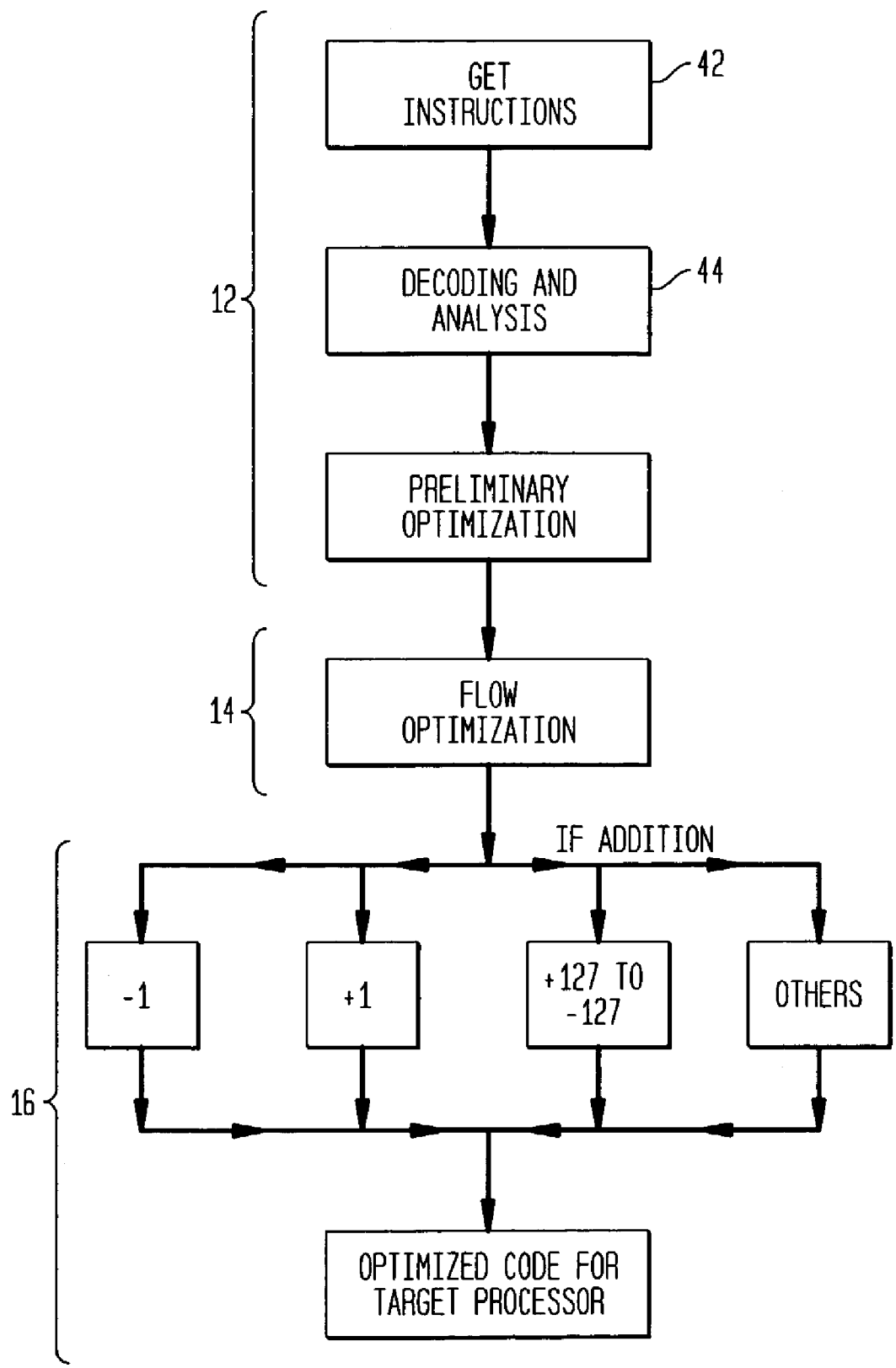

MULTIPLE STAGE PROGRAM RECOMPILER AND METHOD

RELATED APPLICATION

This application claims the benefit of the filing date of U.S. Provisional Application No. 60/175,008, filed Jan. 7, 2000.

BACKGROUND OF THE INVENTION

1. Field of the Invention

The present invention relates to a method and apparatus for emulating source instructions on a target information processing system and, more particularly, to a scheme for translating source instructions to target instructions executable on the target information processing system.

2. Description of Related Art

Information processing system or computing systems comes in many configurations. They include without limitation the generally known computers (such as personal computers), personal digital assistant, video game consoles, application specific control systems, and other systems and devices that incorporate a processing unit. For example, computers have general-purpose central processing units (CPU) which are designed to execute a specific set of instructions.

A CPU of one family, such as the Motorola 680X0 family of processors, manufactured by Motorola, Inc., Phoenix, Ariz., executes instructions unique to this family, a CPU of another family, such as the Intel 80X86 manufactured by Intel Corp., Sunnyvale, Calif., executes instructions unique to that family, and a PowerPC processor family, used in a Macintosh computer manufactured by Apple Computer, Inc., Cupertino, Calif., executes instructions specific to that family. These instructions comprise part of the operating systems of the respective computers in which the respective CPUs reside. Typically, application software programs are then written to run on the respective operating systems.

As another example, video game manufacturers, such as Sony, developed a game player based on a proprietary hardware (processing) platform that runs only game software in a CD format which is specifically developed for its platform. Sony game software would not run on other hardware platforms. Game software based on other platforms would not run on Sony players.

A computer manufacturer will design a computer system with a given CPU and will want to maximize market penetration by having more rather than fewer applications software being able to run on its system. For example, as indicated above, Apple Computer manufactures the PowerPC-based Macintosh line of computers. Applications software that has been written to run on operating systems for the Motorola 680X0 family, for example, may not all run on the PowerPC-based machines. Accordingly, a field of technology has developed in which a given computer having one type of CPU, called a target, will include an emulator that allows the target computer to emulate the instructions, called the source, of another type of CPU. Thus, the target computer will have stored in memory source instructions that may be called in response to applications software, target instructions emulating the source instructions and executable by the target CPU, and an emulator that causes one or more target instructions to be executed in response to a given source instruction. Thus, the given computer can execute target instructions of its own machine, and through emulation execute source instructions.

Two main types of emulation strategies currently are available in the emulation field. The first strategy is known as "interpretation", in which each source instruction is decoded in turn as it is addressed, causing a small sequence of target instructions then to be executed that emulate the source instruction. The main component of an emulator is typically an interpreter that converts each instruction of any program in machine language A into a set of instructions in machine language B, where machine language B is the code language of the target computer on which the emulator is being used. In some instances, interpreters have been implemented in computer hardware or firmware, thereby enabling relatively fast execution of the emulated programs.

The overhead, in terms of speed, for decoding each source instruction each time the source instruction is called is relatively small, but present for each instruction. Consequently, a given source instruction that is addressed and, hence, decoded, many times in the course of running a program will slow the execution time of the overall program being run, i.e., overhead will increase.

The other main emulation strategy is known as "translation", in which the source instructions are analyzed and decoded. This is also referred to as "recompilation" or "cross-compilation". It is well known that the execution speed of computer programs is dramatically reduced by interpreters. It is not uncommon for a computer program to run ten to twenty times slower when it is executed via emulation than when the equivalent program is recompiled into target machine code and the target code version is executed. Due to the well known slowness of software emulation, a number of products have successfully improved on the speed of executing source applications by dynamically cross-compiling portions of such program at run time into target machine code, and then executing the recompiled program portions. While the cross-compilation process typically takes 50 to 100 machine or clock cycles per instruction of the source, the greater speed of the resulting target machine code is, on average, enough to improve the overall speed of execution of most source applications.

The primary reason that overall execution speed is improved by cross-compilation is that most programs contain execution loops of instructions that are repeatedly executed hundreds, thousands, or even millions of times during a typical execution of the program. The source instructions are analyzed and decoded only once, i.e., the first time they are addressed, and the target instruction stream is generated and stored in memory, usually a RAM memory that may be a cache memory. By avoiding repeated interpretation of the instructions in such loops, substantial execution time is saved. Consequently, subsequent emulation of the same source instruction may be performed quickly because the decoding overhead is nonexistent.

While run time cross-compilation of source applications is well known to those skilled in the art, there are several areas in which existing cross-compilation systems have fallen short of their potential. For example, it is necessary to have a relatively large buffer or cache memory in the target computer. A block of memory in the target computer's memory address space is set aside to store the target instruction stream generated during the initial translation process. If this block is large enough to contain the entire translated target instructions, emulation will proceed at the maximum rate since, in response to a given source instruction, the RAM memory can be quickly addressed to access the corresponding sequence of target instructions for execution. Otherwise, there is translation overhead necessary to handle translation of the program in small sections during the execution of the source program. However, it often is expensive or prohibitive to set aside a large enough RAM memory. Furthermore, it may also be impossible to determine how large a RAM memory must be allocated in the target computer's memory address space to contain the translated program. Competition for RAM or cache memory space with other application software running on the same target machine may further limit the execution speed of source applications. For applications involving video graphics, it is important that continuity in the graphics is maintained by the emulation of the source application.

Consequently, a competing interest exists between the size of the RAM memory and the translation overhead. If the RAM memory is relatively large, the translation overhead will be relatively low, but at the high cost of memory. If the RAM is small, reducing memory cost, the translation overhead may be high due, for example, to continually writing newly translated code to the RAM. These drawbacks are more significant with low-end machines running on a slower processor and running on limited amounts of memory.

Accordingly, it is desirable to provide an improved system and method for dynamic recompilation that produces a more efficient set of translated code and uses less memory.

SUMMARY OF THE INVENTION

The present invention is directed to an improved system and method for dynamic recompilation of source software for execution on a target information processing system. The present invention overcome the short comings of the prior art by optimizing the translated code to improve execution speed and to require less memory overhead, thereby reducing the translation overhead and further improving execution speed of the translated code.

In accordance with one aspect of the present invention, in making the translation, the dynamic recompiler considers not only the specific instructions of the source software, but also the intent and purpose of the instructions, to translate to a set of equivalent code for the target system that is optimized based on the target processor where the translated instructions will be running on. The dynamic recompiler essentially determines what the source operation code is trying to accomplish and the best way of doing it at the target processor, in an "interpolative" and context sensitive fashion. The source instructions are processed in blocks of varying sizes by the dynamic recompiler. By processing the block of instruction en masse, the dynamic recompiler considers the instructions that come before and after a current instruction so as to be able to select the most efficient approach out of several available approaches for encoding the operation code for the target processor to perform the equivalent tasks specified by the source instructions.

In one embodiment of the present invention, the dynamic compiler comprises three stages: (1) a decoding stage for decoding the source instructions and parameters, creating an instruction stream that is optimized based on the source instructions and parameters; (2) an optimization stage for optimizing the flow of information and related operation code based on the characteristics of the target processor; and (3) an encoding stage for encoding instructions specifically for the target processor to achieve the intended results, including further optimizing the operation code for the target processor.

For purpose of illustrating the inventive concept, the present invention is described using the example of recompilation of video game software for playing on a personal computer system.

BRIEF DESCRIPTION OF THE DRAWINGS

FIG. 3 is a schematic flow diagram of the dynamic recompilation process in accordance with one embodiment of the present invention.

DESCRIPTION OF THE ILLUSTRATED EMBODIMENTS

Figure 1:
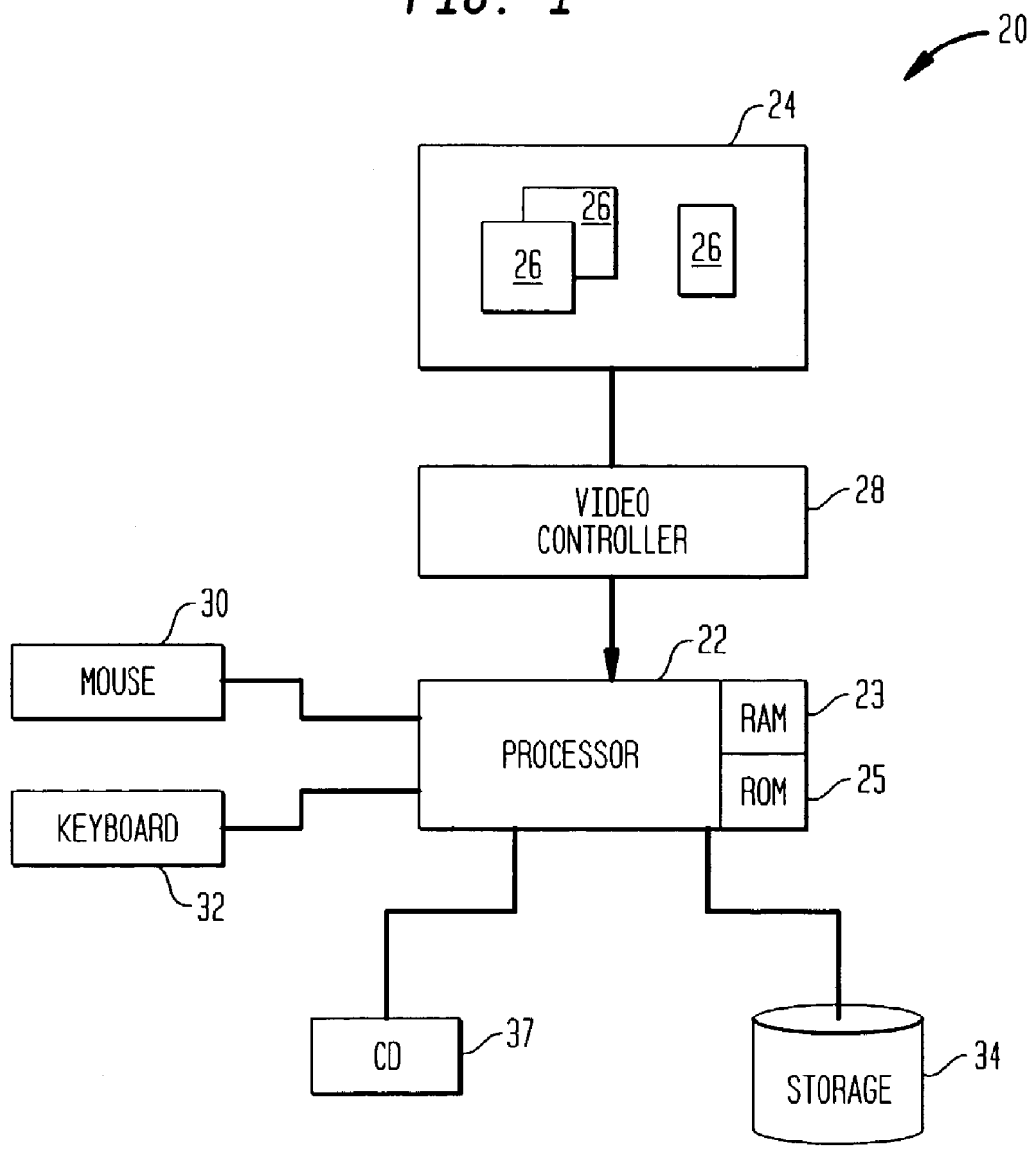
FIG. 1 a schematic representation of one embodiment of a computer system that executes the dynamic recompilation process in accordance with the present invention.

The present description is of the best presently contemplated mode of carrying out the invention. This description is made for the purpose of illustrating the general principles of the invention and should not be taken in a limiting sense. The scope of the invention is best determined by reference to the appended claims.

The present invention is directed to emulation of source instructions on a target information processing system. To facilitate an understanding of the principles and features of the present invention, they are explained herein below with reference to its deployments and implementations in illustrative embodiments. By way of example and not limitation, the present invention is described herein-below in reference to examples of deployments and implementations for translating software written for a proprietary game player for playing on a personal computer.

The present invention can find utility in a variety of implementations without departing from the scope and spirit of the invention, as will be apparent from an understanding of the principles that underlie the invention. It is understood that the dynamic recompilation concept of the present invention may be applied to recompilation of software designed for other hardware and/or software platforms, whether in an information exchange network environment or otherwise. For example, the present invention may be applied to dynamically recompile instructions based on the Motorola 680X0 platform to instructions to run on the Intel 80X86 platform, for game, business, productivity and other types of application software.

It will be appreciated that the line between hardware and software is not always sharp, it being understood by those skilled in the art that such networks and communications facility involve both software and hardware aspects. A method or process is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful devices for performing the operations of the present invention include, but are not limited to, general or specific purpose digital processing and/or information processing devices, which devices may be standalone devices or part of a larger system. As used in the context of the present invention, and generally, digital processing and information processing systems may include computers (such as personal computers), personal digital assistant, video game consoles, application specific systems, and other systems and devices that incorporates a processing unit. The devices may be selectively activated or reconfigured by a program, routine and/or a sequence of instructions and/or logic stored in the devices. In short, use of the methods described and suggested herein is not limited to a particular processing configuration. Prior to discussing details of the inventive aspects of the present invention, it is helpful to discuss one example of an information processing system in which the present invention may be implemented.

Target Processing System

FIG. 1 schematically illustrates one embodiment of a computer system 20 that incorporates dynamic recompilation feature of the present invention. The computer system 20 includes a processor 22 (e.g., an Intel 80X86 processor), internal random-access memory ("RAM") 23 and read-only memory ("ROM") 25, and a data bus architecture for coupling the processor 22 to various internal and external components. A mass storage device 34, such as a hard disk drive, is coupled to the processor 22 for storing utility and application software (including the dynamic recompiler of the present invention) and other data. The application software is executed or performed by the processor 22. A data read/write device 37, such as a CD-ROM drive, DVD drive or floppy disk drive, is provided. The source instructions may be stored in the hard drive 34 or on a CD-ROM for playbacks using the CD-ROM drive 37.

User actuable input devices are also coupled to the processor 22, including a cursor positioning device 30 and a keyboard 32 in accordance with the present invention. The cursor positioning device 30 is representative of any number of input devices that produce signals corresponding to a cursor location on the display 24, and may include by way of example, a game control console, a joy-stick, a mouse, a trackball, an electronic pen, or a touch-pad, which may be an integral part of the keyboard 32. A display 24 is coupled to the processor 22 through a video controller 28. The video controller 28 coordinates the presentation of information on the display 24 in one or more windows 26. Generally, the windows 26 are scalable, thus permitting a user to define the size and location of a particular window 26 on the display 24.

Dynamic Recompilation

By way of example and not limitation, the dynamic recompilation concept of the present invention is discussed in reference to the example of emulation of proprietary video game software for playing on a personal computer system. More specifically, the present invention is discussed in reference to the emulation of video game software that has been written to run on a MIPS R-3000 processor based system (source; e.g. Sony PlayStation) for running on a Intel 80X86 processor based system (target).

In accordance with one aspect of the present invention, in making the translation, the dynamic recompiler considers not only the specific instructions of the source software, but also the intent and purpose of the instructions, to translate to a set of equivalent code for the target system that is optimized based on the target processor where that the translated instructions will be running on. The dynamic recompiler essentially determines what the source operation code is trying to accomplish and the best way of doing it at the target processor, in an "interpolative" fashion. The source instructions are processed in blocks of varying size by the dynamic recompiler at one time. By processing the block of instruction en masse, the dynamic recompiler considers the instructions that come before and after a current instruction so as to be able to select the most efficient approach out of several available approaches for encoding the operation code for the target processor to perform the equivalent tasks specified by the source instructions.

Figure 2:
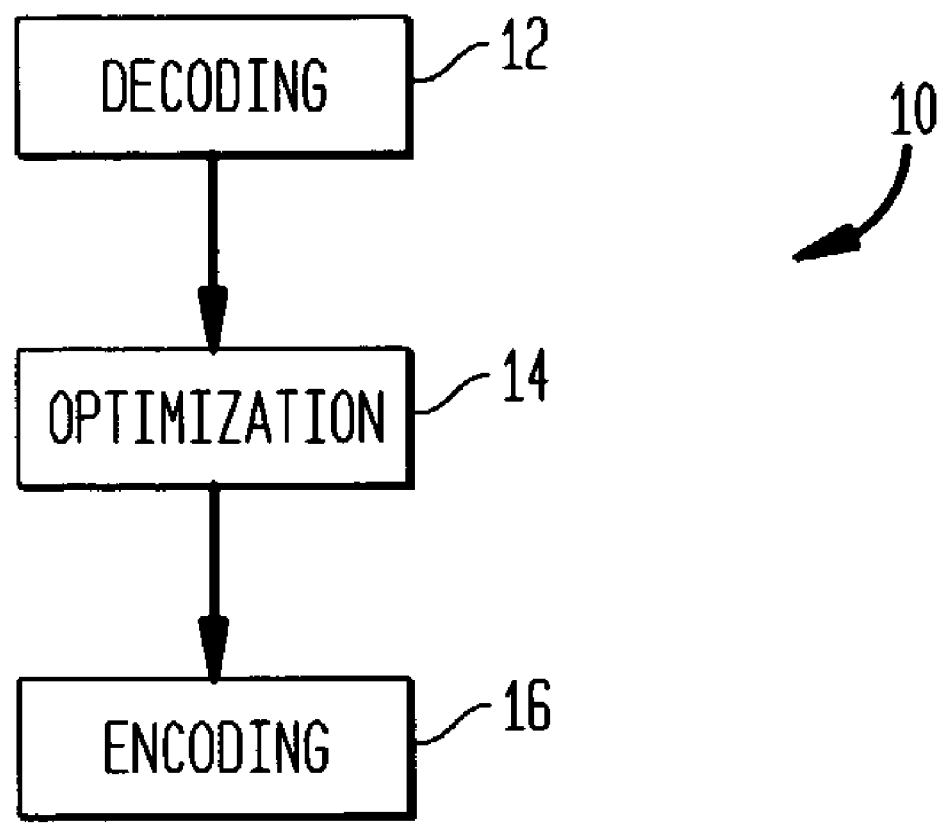
FIG. 2 is a schematic representation of the stages in one embodiment of the dynamic recompiler of the present invention.

In one embodiment of the present invention as schematically illustrated in FIG. 2, the dynamic compiler 10 comprises three stages: (1) a decoding stage for decoding the source instructions and parameters, creating an instruction stream that is optimized based on the source instructions and parameters; (2) an optimization stage 14 for optimizing the flow of information and related operation code based on the characteristics of the target processor; and (3) an encoding stage 16 for encoding instructions specifically for the target processor to achieve the intended results, including optimizing the operation code for the target processor.

FIG. 3 is a schematic flow diagram of the dynamic recompilation process in accordance with one embodiment of the present invention.

Decoding Stage

Referring to FIG. 3, at the decoding stage 12, the source instructions are fetched at 40, e.g. from a CD-ROM read by a CD-ROM drive, a hard drive, or in real time streamed over a network. The instructions are analyzed and decoded at 42 in blocks of varying sizes that depend on several factors, such as the location of the instruction and data in memory or register, the available system resource (e.g., registers, memory), timing, instruction sequences based on functionality of the instructions (e.g., entry point), target processor's operational characteristics. In essence, the purpose of the instructions and flow of information (e.g., where data comes from and going to) are determined at 42. The decoding stage goes through the block of source instructions and analyzes, examines the operation codes, and outputs an instruction string which is basically a breakdown of what the functional operations are doing. For example for addition, it determines what is the addition from, which two numbers are being added, where the numbers come from, and where to put the result of the addition when done. The instruction string output stream contains information on the flow of information in the program.

Taking the decoded instruction, a preliminary optimization of the instruction stream is conducted at 44 to include the following optimization tasks: (a) ignore no-op codes; (b) reduce parameters that do not affect the operation, e.g., Register 3=Register 1 OR Register 1 (the parameter "OR Register" is removed), Register 3=Register 1+0 (the "+0" parameter is removed); (3) translate the instruction sequence into another sequence where the result is always a constant; e.g., Register 3=Register 1 XOR Register 1 (translate to Register 3=0); and (d) ignore the entire instruction if it has no effect; e.g., Register 3=Register 3 OR Register 3 (ignore, since the original value of Register 3 is maintained). The preliminary optimization step 44 outputs the optimized instruction stream in preparation for subsequent flow optimization and encoding.

The decoding stage may be further configured to analyze the instruction stream for data flow to determine if the operation is overridden by subsequent operations. For example, consider the following sequence of instructions C=A+B and C=M+Q, whereby there is no intermediate instruction involving C. The decoding stage determines that the value of C=A+B would be overridden by the value of C=M+Q, therefore the decoding stage would optimize the decoded instruction stream by omitting the C=A+B instruction.

Optimization Stage

The optimization stage 14 takes the instruction stream from the decoding stage 12 and optimizes the flow of information and related operation code based on the characteristics of the target processor. It basically analyzes the instruction stream that was created by the decoding stage, and determines the order and sequence of the operation code for the target processor. While the instruction stream based on the source processor might be addition, subtraction, etc., the instruction stream optimized for the target processor is not instructions per se. Instead, the optimized instruction stream describes the flow of information that is efficient for the target processor. It is noted that one of the core differences in processors is the way they deal with information and the flow of information. At the conclusion of the optimization stage 14, the output is an instruction stream that contains information on the equivalent flow of information to be handled by the target processor to emulate the intended results of the source instructions. One can look at this optimization process as an interpolation from the source instructions to the equivalent results to be achieved by the target processor, independent of the operations specified by the source instructions, but dependent on the intended purpose and flow of the source instructions and how they are to be handled by the target processor to achieve an equivalent result.

To illustrate the optimization stage 14, consider the difference between the MIPS R-3000 processor and the Intel 80X86 processor. The R-3000 processor has 32 general-purpose registers, to which the processor has instantaneous access. There is practically no time delay in accessing the registers as compared to RAM memory. Data retrieval from memory requires a certain amount of time (e.g., 16 nanoseconds). Consider the addition of two numbers residing in memory. The first number is fetched from memory and placed into one of the registers, and the other number is then fetched from memory and placed into another register. The registers are summed to complete the addition function, and the result is placed back into memory. Since the fetching from memory is relatively slow, the optimization stage 14 would minimize the number of fetches from memory that the target processor has to undertake. For example, consider adding the numbers A, B, and C separately to D. The long way of doing this for the source processor would be to fetch the numbers from memory required for the respective additions separately to complete the task; i.e., the number D is fetched three times for the three separate additions. Using the optimization scheme of the present invention for a target Intel 80X86 processor, the numbers A, B, C and D would be fetched from memory and placed in registers. Then D is added to A, B and C separately, and the new values are stored into memory. Accordingly, D is fetched once and used three times, instead of being fetched three times. This reduced instruction set and memory access is especially useful for the 80X86 processor, because it has only 7 registers.

As a further example, the optimization stage 14 efficiently maps the operations based on 32 registers for the source instruction to the 7 registers on the target processor. The optimization stage determines which of the 32 registers are used and in what sequence they are used in the instruction flow. Because it is rare that all 32 registers are used at any given time, the order of the registers that are used (e.g., 10) are determined and the registers on the target processor are temporarily assigned to those 10 registers. Given that an operation could only have a total of 3 different registers in active use at any given time (e.g., the operation A+B=C requires two registers for A and B and a destination register for C), usage of the 7 available registers at the target processor is juggled. The mapping of the 7 target registers to the 32 source registers are constantly switched depending on the need dictated by the operation. Using the same example, if all the 7 registers are occupied and 2 of them are active for A and B, one of the other 5 registers is flushed into memory, and C is loaded into that flushed register. If the data that was flushed is needed again, it can be brought back to the registers by flushing one of the other registers. The optimization stage thus determines the optimized flow of information based on the characteristics of the target processor. Such information is passed onto the subsequent encoding stage 16. This provides the encoding stage the information about the 7 registers, and which to use to create the target instructions not only through actual functionality but to do all the swapping and flushing/purging of the registers. The optimization stage tells the encoding stage which of the registers to map and which to map out, etc.

The optimization stage also optimizes register mapping. Consider C=A+B, where A, B and C are already in memory. The source instruction for the R-3000 processor would require that register A and register B must be loaded from memory, register A is added to register B, and the result is in register C. The operation may require the purging of one or more of the registers on the processor to accommodate the variables, and the storing into memory the result C. The optimization stage recognizes from the instruction stream that the result of the addition is to be placed in register C, so the optimization stage outputs an instruction flow sequence which includes mapping the memory C to the register C, moving of A into register C and adding register B into register C, without fetching the existing value of C from memory because the existing value of C will be overridden eventually. This process is conducted with processor registers and the value of register C does not need to be stored into memory until it needs to be flushed. It has saved the fetching of C from memory and the storing of C back out to memory until it is required, thereby reducing the overall memory load.

The above optimization process would not be applicable to C=C+A, since C must be loaded from memory into register because C is a source for the addition operation. The optimization stage recognizes the difference between the C=A+B and C=C+A scenarios and handles the optimization accordingly. For C=C+A, C is loaded from memory and A is added to register C. Without optimization as the instruction code for the R-3000 processor, the instruction sequence includes fetching A and C, adding and placing the result in a temporary register, and then moving the value in the temporary register into register C.

Referring to the instruction sequences C=A+B and C=M+Q described in connection with the decoding stage, instead of removing the overridden C=A+B instruction at the decoding stage, the dynamic compiler of the present invention may be configured to have the optimization stage to create an optimized instruction flow stream which omits the instructions corresponding to the C=A+B operation, thereby saving potential register purging and reload as well as reducing the amount of target code output.

Many other optimization rules may be developed for other operational scenarios and specific target processors without departing from the scope and spirit of the present invention.

For example, optimization may include interleaving instructions for a target processor (e.g., SH4) which has a pipeline delay in which the data read from memory is not useable until two instructions later. The optimization stage can optimize the flow of information by taking advantage of such delay to read other data before the previously read data is useable.

Encoding Stage

The encoding stage 16 encodes and optimizes the operation codes specific for the target processor. Using the examples of R-3000 and 80X86, the instructions for R-3000 are always 32-bit long (or 4 bytes). For the 80X86, the instructions are variable length, so the instructions might have a 1-byte instruction, a 3-byte instruction, 7-byte instruction and so on. Hence, it is advantages to use the smallest number of instructions and the instructions that take the least number of clock cycles to execute. Conceivably, one can have an instruction that is relatively long, say a 7-byte instruction, but is faster to execute such instruction than executing a number of instructions that are each 2-byte long. Based on the optimized flow of information determined by the optimization stage 14, the encoding stage 16 determines the optimized operation codes to achieve results equivalent to the source instructions.

In accordance with the present invention, the encoding stage provides several operation code options (cases) for achieving the same results. The particular case that is optimal depends on the data flow and intended result determined by the earlier stages. For example, for an addition, there may be four or more cases to achieve the intended addition, including increment by 1, decrement by 1, using the short range −128 to +127, and if outside of the range, apply a regular addition operation. To illustrate with an example, to add 128 to a number, the encoding stage would optimize by subtracting (128) instead, as −(−128)=+128. This is more efficient that using the normal approach of adding 128, because −128 is a short range number that is already available. Accordingly, the result of an addition operation is optimally achieved by a different physical operation, a subtraction operation in the example. Again, the present invention effectively interpolates the optimal operations to achieve the same results intended by the source instructions. In a way, the encoding stage optimizes the target operation code in a context sensitive way.

Similar and analogous logic may be applied to obtain other equivalent results to subtraction, division, multiplication, comparison, etc. without departing from the scope and spirit of the present invention. For example, for multiplication by 2, the number is shifted bit-wise in an operation in accordance with the R-3000 platform. To achieve a similar result of this shift variable operation, the encoding stage of the present invention may provide for several cases for shifting the number to be multiplied by 2 bit-wise to achieve the same result, depending which case is more efficient to obtain the equivalent result.

The process and system of the present invention has been described above in terms of functional modules in block diagram format. It is understood that unless otherwise stated to the contrary herein, one or more functions may be integrated in a single physical device or a software module in a software product, or a function may be implemented in separate physical devices or software modules, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. For example, the dynamic recompiler in accordance with the present invention may be implemented in computer hardware and/or firmware. Further, the dynamic recompilation concept may be applicable to translation of software instructions bases on other types of information handling systems, hardware and/or software platforms (e.g., Motorola 680X0, Intel 80X86, PowerPC-based systems).

Accordingly, it is to be understood that the invention is not to be limited by the specific illustrated embodiments, but only by the scope of the appended claims.

What is claimed is:

1. A method of generating target instructions from a plurality of first instructions, the target instructions executable on a target processor, comprising:
    analyzing the plurality of first instructions en masse by an information processing system to break down the functional operations encoded by the first instructions to produce information representing a flow of information to be handled efficiently by the target processor to achieve results on the target processor equivalent to the results intended to be achieved by the first instructions;
    generating the target instructions by an information processing system based on the information representing the information flow, in preference over particular operations specified by individual ones of the plurality of first instructions.

2. A method as claimed in claim 1, wherein the first instructions are not executable on the target processor.

3. A method for executing target instructions generated according to a method as claimed in claim 1, wherein the information representing the information flow is produced and the target instructions are generated at run-time, after accessing the plurality of first instructions from a predetermined memory, the method further comprising executing the target instructions without requiring the target instructions to be first stored to the predetermined memory.

4. A method of generating target instructions as claimed in claim 1, wherein individual ones of the target instructions are generated without regard to particular operations specified by the individual ones of the plurality of first instructions.

5. A method as claimed in claim 1, wherein the plurality of first instructions are according to a first machine language, the plurality of first instructions being of a type executable by a first processor but not executable by the target processor, and the target instructions are according to a second machine language, the target instructions being of a type executable by the target processor.

6. A method as claimed in claim 5, wherein, the first processor has a first number of registers and the target processor has a second number of registers which is less than the first number, wherein the target instructions are generated so as to reduce a number of transfers between a register of the target processor and a memory associated with the target processor.

7. A method as claimed in claim 5, wherein the target instructions specify a target number of transfers between a register of the target processor and a memory associated with the target processor, the target number being reduced in relation to a number of transfers specified by the plurality of first instructions between a register of the first processor and a memory associated with the first processor.

8. A method as claimed in claim 1, wherein the target instructions are generated in a manner to reduce a number of machine cycles required to execute the target instructions.

9. A method as claimed in claim 8, wherein the number of machine cycles is reduced in relation to the number of machine cycles that would be required to execute instructions according to a literal translation of the plurality of first instructions into the second machine language.

10. A method as claimed in claim 7, wherein the target number of transfers is further reduced in relation to a number of transfers resulting from a literal translation of the plurality of first instructions into the second machine language.

11. A method as claimed in claim 7, wherein the target instructions are generated so as to minimize the target number of transfers.

12. A method as claimed in claim 7, wherein the number of transfers is further reduced by reducing a number of transfers of a particular operand between the register of the target processor and the memory associated with the target processor, the operand required for execution of each of a plurality of the target instructions.

13. A method as claimed in claim 1, wherein at least one of the target instructions is generated to specify a second physical operation that is different from, but equivalent to a first physical operation specified by one or more instructions of the plurality of first instructions.

14. A method as claimed in claim 13, wherein the at least one target instruction is equivalent in context to the first physical operation.

15. A method according to claim 1, further comprising determining a purpose to be achieved by the plurality of first instructions en masse, wherein the step of generating the target instructions includes eliminating operations specified by the plurality of first instructions which are unnecessary to achieve the determined purpose.

16. A method according to claim 1, further comprising eliminating operations specified by the plurality of first instructions which are unnecessary to support the information flow.

17. A method as claimed in claim 1, wherein the step of generating the target instructions includes translating first operations specified by the plurality of first instructions to target operations different from the first operations to reduce the number of machine cycles required to execute the target instructions.

18. A method as claimed in claim 1, further comprising determining a purpose to be achieved by the plurality of first instructions en masse, the purpose being determined by determining a sequence of operations specified by the plurality of first instructions, and removing ones of the specified operations from the sequence which are unnecessary to support the determined purpose, wherein the target instructions are generated after the unnecessary operations are removed from the sequence.

19. A method as claimed in claim 1, wherein a target instruction of the target instructions is generated by selecting a target instruction from a plurality of target instructions specifying respective equivalent operations performable by the target processor, the target instruction being selected in a manner to reduce a number of machine cycles required to execute the selected target instruction relative to another one of the target instructions which specifies the equivalent operation.

20. A machine-readable medium having information recorded thereon for performing a method of generating target instructions from a plurality of first instructions, the target instructions executable on a target processor, the method comprising:
 analyzing the plurality of first instructions en masse by an information processing system to break down the functional operations encoded by the first instructions to produce information representing a flow of information to be handled efficiently by the target processor to achieve results on the target processor equivalent to the results intended to be achieved by the first instructions;
 generating the target instructions by an information processing system based on the information representing the information flow, in preference over particular operations specified by individual ones of the plurality of first instructions.

21. A machine-readable medium as claimed in claim 20, wherein the information representing the information flow is produced and the target instructions are generated at runtime, after accessing the plurality of first instructions from a predetermined memory, the method further comprising executing the target instructions without requiring the target instructions to be first stored to the predetermined memory.

22. A machine-readable medium as claimed in claim 20, wherein the plurality of first instructions are according to a first machine language, the plurality of first instructions being of a type executable by a first processor but not executable by the target processor, and the target instructions are according to a second machine language, the target instructions being of a type executable by the target processor.

23. A machine-readable medium as claimed in claim 22, wherein the target instructions specify a target number of transfers between a register of the target processor and a memory associated with the target processor, the target number being reduced in relation to a number of transfers specified by the plurality of first instructions between a register of the first processor and a memory associated with the first processor.

24. A machine-readable medium as claimed in claim 23, wherein the number of transfers is further reduced in relation to a number of transfers resulting from a literal translation of the plurality of first instructions into the second machine language.

25. A machine-readable medium as claimed in claim 23, wherein the number of transfers is further reduced by reducing a number of transfers of a particular operand between the register and the memory associated with the target processor, the operand required for execution of each of a plurality of the target instructions.

26. A machine-readable medium according to claim 20, wherein the method further comprises determining a purpose to be achieved by the plurality of first instructions en masse, and the step of generating the target instructions includes eliminating operations specified by the plurality of first instructions which are unnecessary to achieve the determined purpose.

27. A machine-readable medium as claimed in claim 20, wherein the step of generating the target instructions includes translating first operations specified by the plurality of first instructions to target operations different from the first operations, to reduce the number of machine cycles required to execute the target instructions.

28. An information processing system operable to generate a plurality of target instructions from a plurality of first instructions, the target instructions executable on a target processor, the system being operable to analyze the plurality of first instructions en masse to break down the functional operations encoded by the first instructions to produce information representing a flow of information to be handled efficiently by the target processor to achieve results on the target processor equivalent to the results intended to be achieved by the first instructions, and to generate the target instructions based on the information representing the information flow, in preference over particular operations specified by individual ones of the plurality of first instructions.

29. A system as claimed in claim 28, wherein the plurality of first instructions are according to a first machine language, the plurality of first instructions being of a type executable by a first processor but not executable by the target processor, and the system is operable to generate the target instructions according to a second machine language, the target instructions being of a type executable by the target processor.

30. A system as claimed in claim 29, wherein the system is operable to generate the target instructions such that, upon execution of the target instructions, a number of transfers between a register of the target processor and a memory associated with the target processor is reduced in relation to the number of transfers specified by the plurality of first instructions between a register of the first processor and a memory associated with the first processor.

31. A system as claimed in claim 30, wherein the system is operable to further reduce the number of transfers between the target processor and the memory associated therewith in relation to a number of transfers resulting from a literal translation of the plurality of first instructions into the second machine language.

32. A system as claimed in claim 30, wherein the system is further operable in relation to transfers specified by the plurality of first instructions, to reduce a number of transfers of a particular operand between the register of the target processor and the memory associated with the target processor, the operand required for execution of each of a plurality of the target instructions.

33. A system according to claim 28, wherein the system is operable to generate the target instructions so as to eliminate operations specified by the plurality of first instructions which are unnecessary to achieve the determined purpose.

34. A system as claimed in claim 28, wherein the system is operable to generate the target instructions so as to translate first operations specified by the plurality of first instructions to target operations different from the first operations, to reduce a number of machine cycles required to execute the target instructions.

35. A system operable to generate target instructions from a plurality of first instructions, the target instructions executable by a target processor, the system comprising:
   a first stage operable to analyze the plurality of first instructions en masse to break down first operations encoded by the plurality of first instructions to produce information representing a first flow of information specified by the plurality of first instructions;
   a second stage responsive to the first flow of information to specify a second flow of information for performing second operations to achieve results equivalent to the results intended to be achieved by the first operations, in preference over particular first operations specified by individual ones of the plurality of first instructions, the second flow of information adapted for more efficient execution on the target processor than the first flow of information; and
   a third stage operable to generate target instructions from the second flow of information, wherein the third stage is operable to generate the target instructions through operation including selecting operation codes of instructions from among a plurality of operation codes specifying different but equivalent physical operations.

36. A method of generating target instructions from a plurality of first instructions, the target instructions executable on a target processor, comprising:
   analyzing the plurality of first instructions en masse by an information processing system to break down the functional operations encoded by the first instructions to produce information representing a flow of information to be handled efficiently by the target processor to achieve results on the target processor equivalent to the results intended to be achieved by the first instructions; and
   generating the target instructions by an information processing system based on the information representing the information flow, in preference over particular operations specified by individual ones of the plurality of first instructions,
   wherein said step of analyzing includes omitting an operation encoded by a given one of said plurality of first instructions from said information flow when said operation is overridden by another operation encoded by a second one of said plurality of first instructions.

37. A method of generating target instructions from a plurality of first instructions, the plurality of first instructions being according to a first machine language and being executable by a first processor but not executable by a target processor, and the target instructions being according to a target machine language and being executable by a target processor, the method comprising:
   analyzing the plurality of first instructions according to the first machine language en masse by an information processing system to break down the functional operations encoded by the first instructions to produce information representing a flow of information to be handled efficiently by the target processor to achieve results on the target processor equivalent to the results intended to be achieved by the first instructions; and
   generating the target instructions according to the target machine language by an information processing system based on the information representing the information flow, in preference over particular operations specified by individual ones of the plurality of first instructions.

38. A method of generating target instructions from a plurality of first instructions, the target instructions executable on a target processor, comprising:
   analyzing the plurality of first instructions en masse by an information processing system to break down the functional operations encoded by the first instructions to produce information representing a flow of information to be handled by the target processor to achieve results on the target processor equivalent to the results intended to be achieved by the first instructions, the first instructions specifying a first number of transfers between a register of the first processor and a memory associated with the first processor; and
   generating the target instructions by an information processing system based on the information representing the information flow in preference over particular operations specified by individual ones of the plurality of first instructions, the target instructions specifying a target number of transfers between a register of the target processor and a memory associated with the target processor, the target number being reduced in relation to the first number.

39. A method of generating target instructions from a plurality of first instructions executable on a first processor using a plurality of first registers of the first processor, the target instructions being executable on a target processor using a plurality of target registers of the target processor, comprising:

analyzing the plurality of first instructions en masse by an information processing system to break down the functional operations encoded by the first instructions to produce information representing a flow of information to be handled efficiently by the target processor to achieve results on the target processor equivalent to the results intended to be achieved by the first instructions; and generating the target instructions by an information processing system based on the information representing the information flow, in preference over particular operations specified by individual ones of the plurality of first instructions, wherein the step of generating the target instructions includes mapping a usage of the target registers in accordance with the target instructions to a usage of the first registers in accordance with the first instructions based on the information representing the information flow, and the mapping varies with time in accordance with the equivalent results sought to be achieved by executing the target instructions on the target processor.

* * * * *